United States Patent
Frink

(10) Patent No.: US 7,127,334 B2
(45) Date of Patent: Oct. 24, 2006

(54) SYSTEM AND METHODS FOR PREVENTING THE UNAUTHORIZED USE OF AIRCRAFT

(76) Inventor: Bentley D. Frink, 5621 Harvest Grove La., Wilmington, NC (US) 28409

( * ) Notice: Subject to any disclaimer, the term of this patent is extended or adjusted under 35 U.S.C. 154(b) by 95 days.

(21) Appl. No.: 10/727,447

(22) Filed: Dec. 3, 2003

(65) Prior Publication Data
US 2004/0249519 A1    Dec. 9, 2004

Related U.S. Application Data

(60) Provisional application No. 60/430,730, filed on Dec. 3, 2002.

(51) Int. Cl.
*G01C 23/00*  (2006.01)
*G01S 13/04*  (2006.01)

(52) U.S. Cl. .............................. 701/3; 701/14; 342/29
(58) Field of Classification Search ................ 701/1–3, 701/23–25, 206, 9–11, 14; 340/870.01, 870.11, 340/870.16, 945, 963; 342/29, 357.09, 357.1, 342/357.13
See application file for complete search history.

(56) References Cited

U.S. PATENT DOCUMENTS

| | | | |
|---|---|---|---|
| 6,199,008 B1 * | 3/2001 | Aratow et al. | 701/120 |
| 2001/0038342 A1 * | 11/2001 | Foote | 340/870.02 |

* cited by examiner

*Primary Examiner*—Yonel Beaulieu
(74) *Attorney, Agent, or Firm*—Bentley D. Frink

(57) ABSTRACT

An aircraft having a memory loaded with geolocation data corresponding to restricted airspace boundaries and an autonomous system for rerouting the aircraft outside of the restricted airspace boundaries as the aircraft approaches to within a predetermined distance of the restricted airspace.

16 Claims, 4 Drawing Sheets

SYSTEM AND METHODS FOR PREVENTING THE UNAUTHORIZED USE OF AIRCRAFT

This application claims benefit of U.S. Provisional Application No. 60/430,730, filed Dec. 3, 2002, which is incorporated herein by reference.

BACKGROUND OF THE INVENTION (1) Field of the Invention

The present invention relates to methods for operating manned aircraft and unmanned aerial vehicles. In particular, the invention provides computerized methods for preventing the unauthorized use of manned aircraft and unmanned aerial vehicles.

(2) Description of the Prior Art

On Sep. 11th, 2001 terrorists commandeered passenger aircraft and flew them into the twin towers of the World Trade Center. At present there are no automatic means to prevent manned aircraft from flying into restricted airspace such as areas around government buildings and high value terrorist targets such as the World Trade Center etc. The prior art has focused only on preventing aircraft from hitting terrain such as mountain ranges using GPS based geofencing type techniques. However, no prior art has been located that extends geofencing techniques to include real-time airspace restrictions such as those activated by the Department of Homeland Security's Yellow, Orange and Red based threat warning system. What is needed is a system and method that autonomously prevents unauthorized aircraft from entering restricted airspace based upon real-time and/or near real-time geolocation data corresponding to restricted airspace boundaries.

Moreover, Unmanned Aerial Vehicles (UAVs) are predominately used in military applications. However, many civilian commercial applications are currently being identified and prolific use of unmanned aerial vehicles for civilian commercial applications is envisioned. While it is likely that the physical size of most civilian UAVs will be relatively small, within the range of radio control model airplanes, a security concern pertaining to unauthorized use of UAVs has come to the forefront, due to the threat of global terrorism. In particular, the concern is that an unauthorized person or group could weaponize a UAV by adding a warhead payload. The warhead could be chemical, biological or explosive, including explosive radiological.

The fear is that an unauthorized person or group would program a UAV's navigation system with navigation waypoints to target a civilian population or military asset. What is needed is a way to prevent unauthorized use of a UAV.

SUMMARY OF THE INVENTION

The present invention addresses these needs by providing a flight authorization system along with methods for preventing unauthorized flight of both manned and unmanned aircraft (UAVs). In one embodiment, the authorization system includes an authorization controller that can be software, hardware or combination of software and hardware. Specifically, every modern aircraft must have a flight control system. The flight control system is made up of a navigation system, flight computer and flight control servos or actuators. The navigation system can include an inertial guidance system made up of roll, pitch and yaw sensors such as gyroscopes, and accelerometers. In the case of small UAVs, the navigation system could also include a horizon detector such as an IR camera or horizon-finding apparatus such as disclosed in U.S. Pat. No. 6,181,989 to Gwozdecki.

Moreover, the navigation system of any modern aircraft includes a global positioning system receiver (GPS) for determining very accurate longitude and latitude world coordinates of an aircraft's global position. The flight computer receives navigation data from the navigation system. The flight computer uses the navigation data to generate and send appropriate control signals to servos that move the control surfaces of the aircraft. The flight computer also usually controls a propulsion system that propels the aircraft. The prime mover of the propulsion system can be one or more electric motors, internal combustion engines, jet turbine engines or rocket engines. In any event, disabling any of the above-mentioned systems can prevent unauthorized use of aircraft before the aircraft leaves the ground. On the other hand, if the aircraft is in flight the authorization system includes an autonomous means for rerouting the aircraft outside of any restricted airspace boundaries as the aircraft approaches to within a predetermined distance of the restricted airspace.

The inventive authorization system includes a restricted area database within the memory of the aircraft's navigation system. The authorization controller to prevent the intentional or unintentional over-flight of restricted areas uses this database. The authorization controller would compare user-loaded waypoints and/or calculated flight paths against the restricted area database. If the programmed flight path of the aircraft would enter a restricted area as defined by the database, the authorization controller would disable the aircraft before take off. The authorization controller can also include instructions to permanently disable the aircraft in the event repeated and excessive attempts are made to enter flight waypoints that would direct the aircraft into a restricted area. In such an event, the aircraft can be permanently disabled by an automatic erasure of the flight control system's memory. Counting the number of attempts to waypoints that would take the aircraft into a restricted area can trigger the erasure. For example the erasure could be triggered after the number of restricted waypoint entry attempts exceeds a predetermined number.

In the event the aircraft is in flight the autonomous means is a flight computer programmed with software capable of rerouting the aircraft to a predetermined safe area. The flight computer can further include software routines to loiter the aircraft over a predetermined safe area. In the case of a passenger airliner, the predetermined safe area may be a body of water or an Air Force base. In the case of a UAV the safe are could be the UAV's launching point.

Another embodiment adds additional security by requiring an authority approved flight plan waypoint set to be loaded into the flight control system of an aircraft. The authority that approves the flight plan could be a governmental agency such as the FAA.

An authorization controller that is a member of the UAV flight control system verifies the authenticity of the flight plan waypoint set by validating an authorization code included with the waypoint set. A centralized flight plan approval clearinghouse would generate the flight plan. The clearinghouse could be a computer running flight-planning software having access to a restricted area database. A flight planning process would begin when a user sends a desired destination coordinates list to the clearinghouse. The clearinghouse would then process the user's flight destination coordinates list providing the aircraft user with an approved flight plan waypoint set that the user can load into the aircraft flight or navigational control system. The waypoint set could also include an authorization code and expiration date that would prevent the flight plan from being used more than once. The clearinghouse could also generate and post a Notice-To-Airman or NOTAM, detailing the time, date and flight path of the aircraft. The NOTAM posting could automatically be emailed and/or posted to an appropriate Internet website such as an FAA website, local airport, etc.

The clearinghouse would have a large real-time database of restricted areas for the airspace of North America. This database would be used in conjunction with the user's destination coordinates list to prevent flight into restricted areas or hazardous terrain. The clearinghouse generated waypoint sets would be particularly useful to the aircraft user, because it would remove from the user the burden of flight path planning. For example, the user would not have to concern himself or herself with planning flight paths around obstacles such as cellular radio towers because the clearinghouse would automatically generate waypoint sets to avoid such obstacles.

The clearinghouse central computer could be in communication with the Internet to provide a web page where users could enter their aircraft's destination coordinates list. The central computer would use the web page data to generate a waypoint list for the user. The waypoint list could then be downloaded from a file-transport-protocol or FTP site.

Alternatively, the aircraft user could use email to send an aircraft flight destination coordinates list to the clearinghouse computer. The clearinghouse computer would then generate an approved flight waypoint list and send it to the user by way of an email reply. The entire process from the time the user's emailed list arrives until the user receives the corresponding clearinghouse generated waypoints list would be on the order of seconds and minutes.

Figure 1:
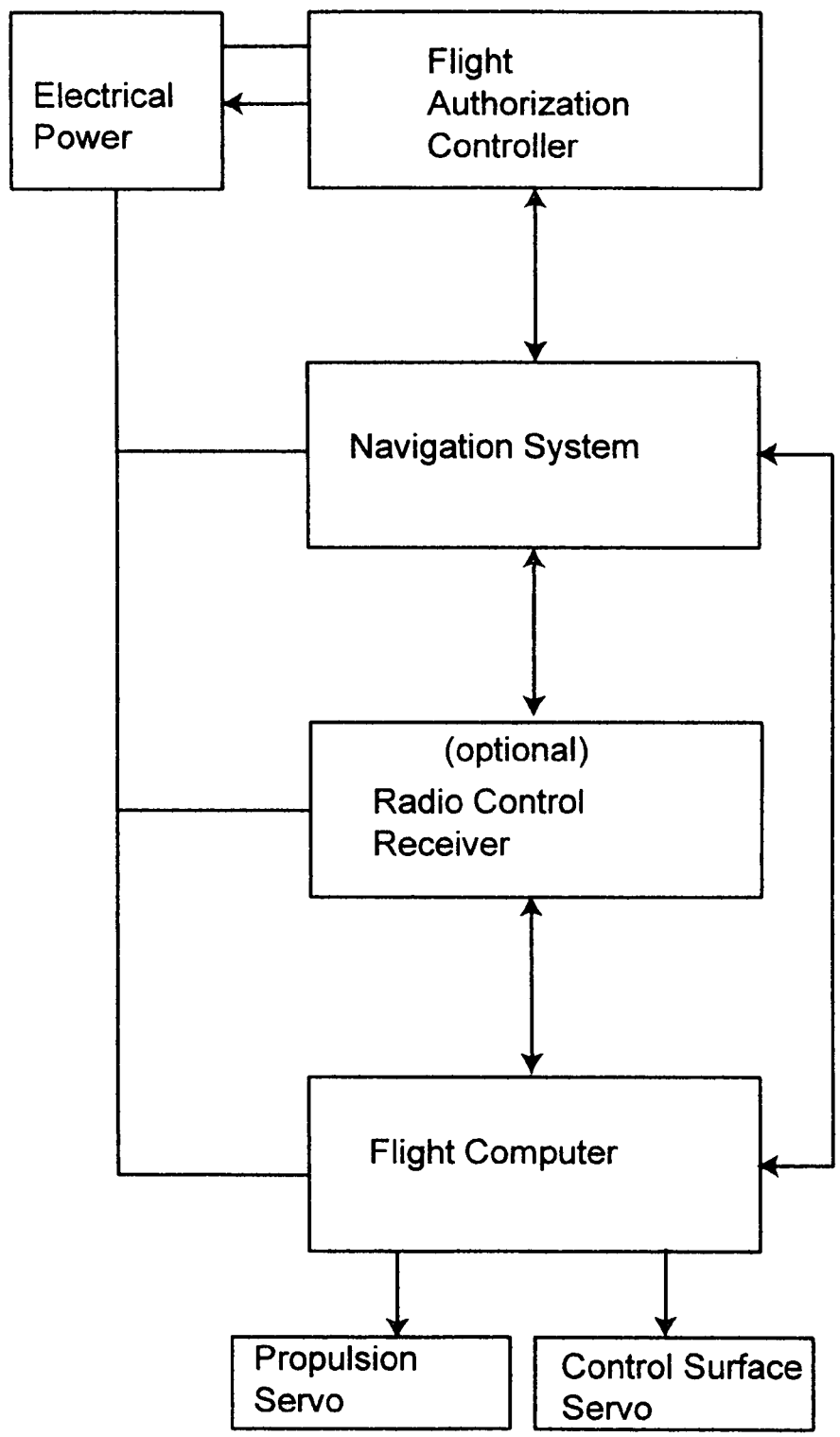
FIG. 1 is a block diagram of an aircraft flight control system including the authorization controller.
Figure 2:
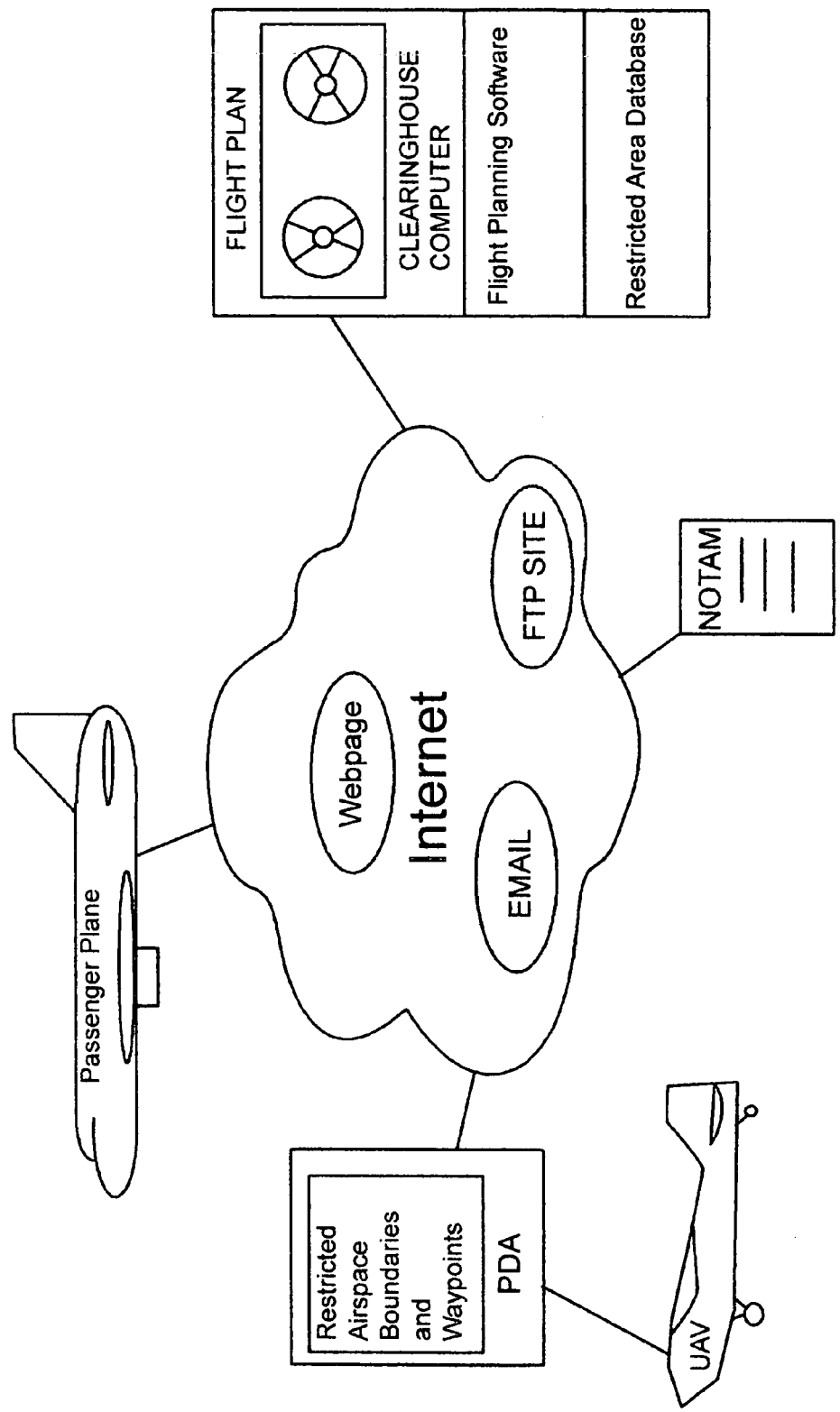
FIG. 2 is a diagram of the Internet based flight planning and authorization system.

METHOD AND SYSTEM FOR INCREASING THE FLIGHT SAFETY OF RADIO CONTROL FLYING MODELS

An adaptation of the previous invention could be useful for increasing the flight safety of radio control flying models. For example, it is desirable to prevent unintentional uncontrolled flight of radio control model airplanes. While radio control models have a good safety record, there is need for improvement. For instance, a properly aerodynamically trimmed airplane can fly with no control inputs for many miles before crashing. A failure of the pilot's transmitter is one cause of these types of accidents know as "flyaway" accidents. Flyaway accidents are usually caused by premature discharge of a transmitter battery or by the breakage of the control transmitter's antenna.

Prior art, attempts to solve this problem center around "fail safe" mechanisms or automated procedures. One popular "fail safe" procedure relies on the radio receiver in the RC model detecting a loss of control signal. As a result of a loss of signal, a controller in communication with the radio receiver reduces the "flyaway" aircraft's power plant output and directs its flight control surfaces to positions that hopefully result in a lower energy descent to a crash landing. Unfortunately, the inevitable crash landing is significantly left to chance. For example, with no further direction possible from the pilot, the aircraft could possibly spiral directly into someone's home or perhaps worse into a car traveling along a busy street, etc. At best, the aircraft will probably be damaged severely by crash landing into trees or other rough terrain. What is needed is a "fail safe" system and method that automatically directs the model to a predetermined safe area in the event of a radio control pilot's transmitter failure.

SUMMARY OF THE INVENTION

The present invention prevents the unintentional uncontrolled flight of a radio control model airplane by providing an automated programmable flight control system based upon GPS navigation that will direct a flying model to a safe area in the event of loss of command and control signal. The system consists primarily of components onboard the aircraft to be "fail-safed". These components perform the same function as the UAV flight control system described in the previous section entitled System and Methods for Preventing the Unauthorized Use of Aircraft. In this section the flight control system components are referred to as UAV components. However, in the case of a radio control model a radio receiver for controlling the model from a radio control transmitter is mandatory. Moreover, the UAV components do not normally control the aircraft, instead the radio control pilot controls the model aircraft normally by way of the radio control transmitter unless and until there is an emergency such as loss of transmitter power, pilot disorientation, or loss of visual contact with the aircraft. In the case of loss of transmitter power the model airplane would be directed by the UAV components to a predetermined safe area such as back into the pilot's normal flight area over a model airfield, etc. The aircraft could be forced by the UAV components to fly a predetermined loiter pattern such as a circular pattern until fuel runs low. The loiter pattern would give the pilot a chance to change transmitter to fresh transmitter batteries or get close enough to the aircraft to regain transmitter control even with a damaged antenna, etc. The prior art "fail safe" on the aircrafts radio receiver could be used to signal a component that the receiver had detected a no signal condition. The signal to the UAV component could be sent by way of an unused servo channel.

In the case of pilot disorientation, the radio receiver could be set up to by way of a servo channel to switch to UAV control upon receipt of a signal from the pilot. For instance, a normally used channel could be set up as a logic "on/off" condition for the UAV system of components. The UAV system could also takeover as result of an extreme control input from the pilot. An example could be an extreme aileron movement, etc. In the case the system is to be used in non-aerobatic aircraft, the UAV system could be programmed to takeover automatically in the event of sudden extreme loss of altitude or airspeed. Other UAV system triggers could be detected by fuzzy logic. For example, fuzzy logic could be used to detect erratic flight maneuvers, etc.

The navigation component of the UAV system belonging to the model aircraft could be field programmed with exclusion zones that would prevent the unsafe over-flight of homes, crowds of people, highways, etc. The field programming of the exclusion zones could be accomplished by transferring navigation restriction data from a PDA or other type of computer to a memory bank belonging to the navigational component of the UAV system. The UAV system would use the navigation restriction data to avoid over-flying restricted areas. Furthermore, a user could define a predetermined flight path to be followed in the event of an emergency such as loss of control signal. The predetermined flight path could be set up to direct the aircraft away from hazardous terrain. If appropriate the aircraft could be outfitted with a recovery device such as a streamer or parachute that could be deployed by the UAV system once the aircraft was safely over a predetermined landing point. On the other hand, the system of the present invention could be concealed within scale models while retaining the ability to automatically prevent the model from inadvertently flying in an unsafe manner such as would be the case in a flyaway situation. Furthermore, the UAV system of the present invention could be preprogrammed to operate in UAV mode only when within a predetermined range from a sanctioned radio control flying field. There are many American Modelers Association flying sanctioned flying fields within the United States and the geographic coordinates of each are readily available. The geographical points of all sanctioned fields could be stored within the navigation system of the model airplanes navigation system. The flight control system of the model plane could be programmed such that the propulsion or other key system of the aircraft would not work beyond a certain range from a sanctioned airfield. This optional feature of the invention could be used to prevent terrorist from using model aircraft as weapons. The system could be made an integral part of radio control receivers. Furthermore, a license to add new airfields to the sanctioned list could be applied for.

UAV Communications Relay System

Figure 3:
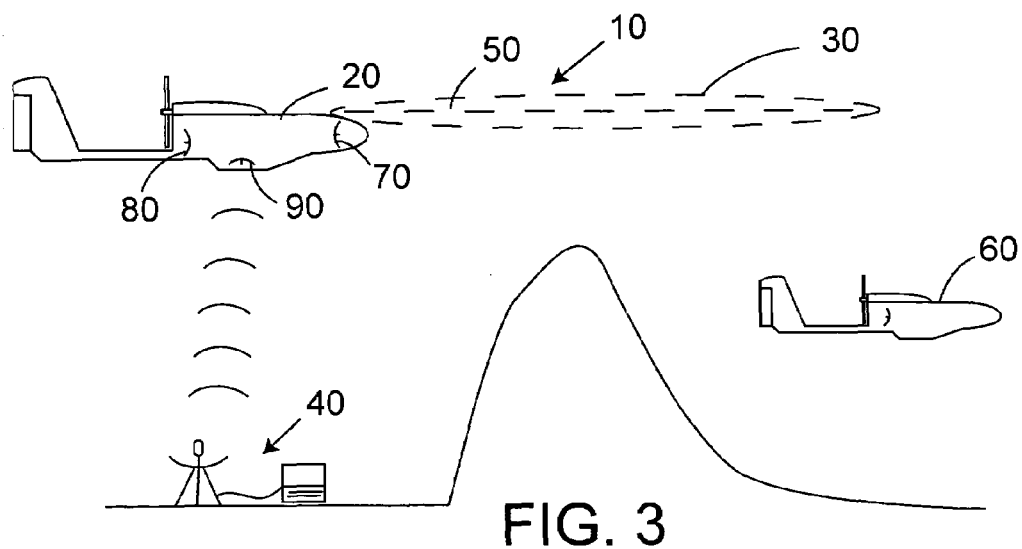
FIG. 3 depicts a communications relay system useful for unmanned air vehicle missions.

FIG. 3 depicts a communications relay system generally 10 useful for unmanned air vehicle missions. A first unmanned air vehicle (UAV) 20, flies in a predetermined pattern 30 such as a racetrack pattern within wireless communications range of a ground station 40. The pattern can have a longitudinal axis 50 directed towards a second unmanned air vehicle (UAV) 60. UAV 60 can be beyond the communications range of ground station 40. UAV 20 can have multiple communications antennas for communicating with UAV 60 and ground station 40.

In one embodiment, UAV 20 has a forwardly directed high gain antenna 70 and a rearwardly directed high gain antenna 60. In this embodiment, the forwardly directed high gain antenna 70 is used to communicate with UAV 60 while UAV 20 is flying toward UAV 60. Rearwardly directed high gain antenna 80 is used to communicate with UAV 60 whenever UAV 20 is flying away from UAV 60. A third antenna 90 can be directed downwardly to communicate with ground station 40.

Figure 4:
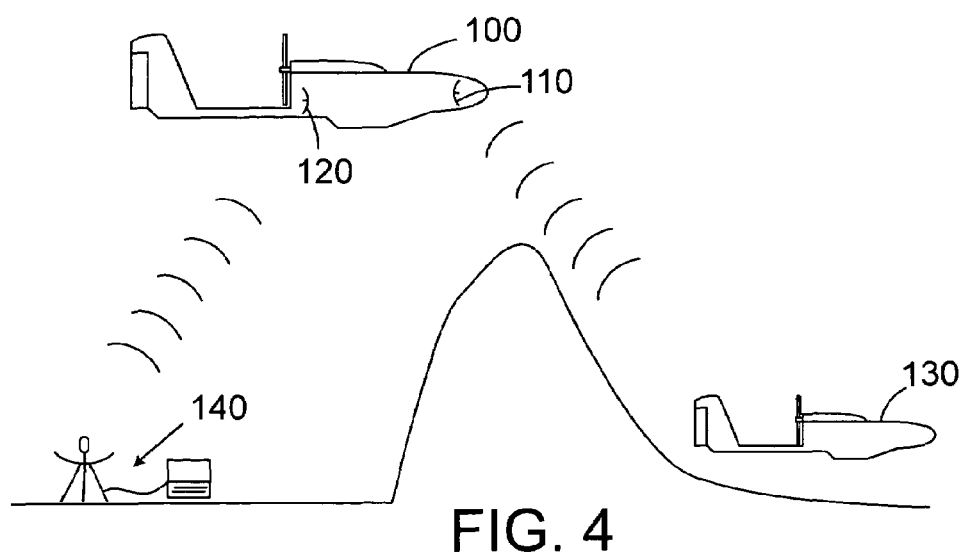
FIG. 4 depicts another embodiment, in which a UAV uses a forwardly directed antenna and a rearwardly directed antenna to alternately communicate with another UAV and a ground station.

FIG. 4 depicts another embodiment, in which a UAV 100 uses a forwardly directed antenna 110 and a rearwardly directed antenna 120 to alternately communicate with another UAV 130 and a ground station 140. In this configuration, UAV 100 should fly a racetrack pattern between ground station 140 and UAV 100, that way antenna 110 can be used to communicate with ground station 140 whenever UAV 100 is flying away from UAV 130.

Conversely, whenever UAV 100 is flying towards UAV 130, rearwardly directed antenna 120 can be used to communicate with ground station 140.

Pre-Packetization of Data Logger Data for Rapid Wireless Retrieval

There exist a need to rapidly download data collected by legacy data loggers. At present many of legacy data loggers are not capable of transferring data as fast as modern wireless systems can transmit data. What is needed is a upgrade device that can adapt data collected by legacy data loggers such that the data can be transferred at high bit rates such as 19.2 kbps and higher.

SUMMARY OF THE INVENTION

Figure 5:
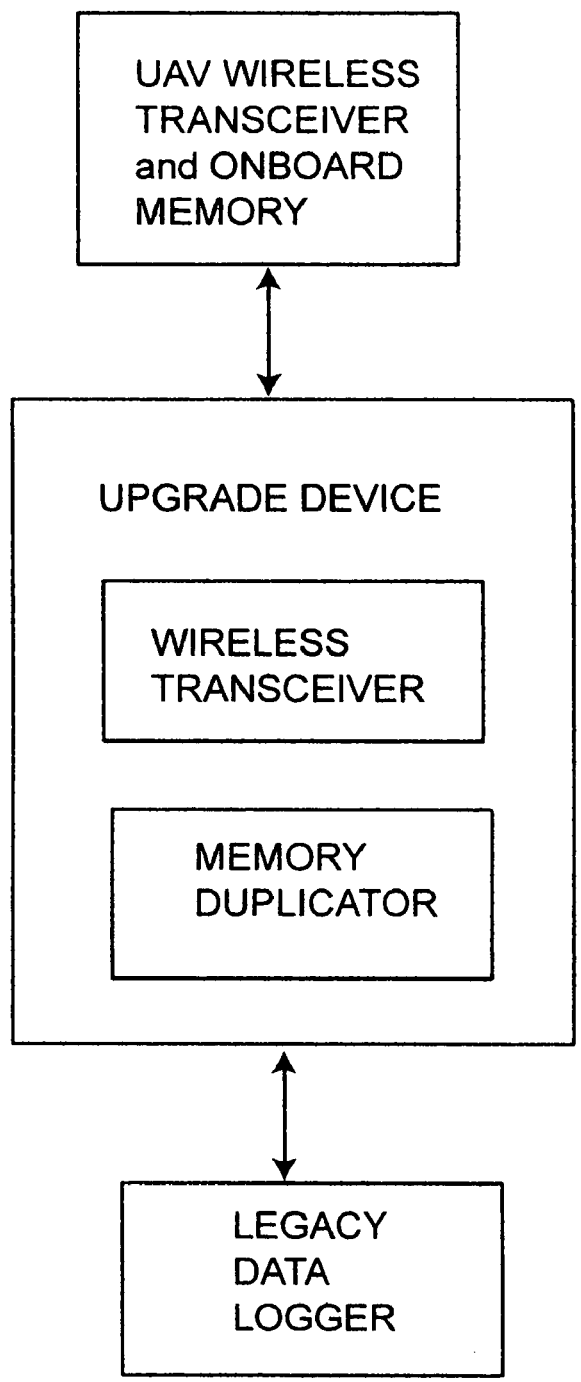
FIG. 5 is a block diagram depicting a UAV wireless transceiver and onboard memory in communication with an upgrade device in communication with a legacy data logger.

The present invention is a wireless transceiver having an RF portion and a controller in communication with enough memory to substantially make a duplicate copy of a legacy data logger's data memory. See FIG. 5. The data collected by the legacy data logger can be transferred at the moment the data is collected by the data logger or collected segments of the data logger's memory can be copied into the transceiver's memory at predetermined intervals such as one minute past mid-night, etc. This way a copy of the legacy data logger's memory will be transferred to the transceiver memory and will be ready for wireless transmission at a data rate greater than the capability of the legacy data logger. Moreover, the transceiver memory could be increased to accommodate not only a raw data copy of the legacy data logger but could also be large enough to hold a pre-packetized copy of the legacy data logger's collected data. The pre-packetization would be in accordance with a wireless transfer protocol such as IEEE 802.11, Home RF, and BlueTooth, or a proprietary protocol, etc. The pre-packetization would allow very efficient transfer of the legacy data logger's data at the time of data collection be a wireless data retrieval device. The wireless data retrieval device can be another wireless transceiver similar to the transceiver in communication with the legacy data logger. The data retrieval device could be in communication with a PDA such as a Palm Pilot™ PDA. Alternately, the data retrieval device could be in communication with a memory bank and navigation system of an unmanned aerial vehicle for automatic data retrieval from fielded data loggers.

In operation, the wireless transceiver in communication with a pre-packetization memory would accept data at the moment a legacy data logger collects data. A controller in controlling the wireless data logger would then pre-packetize the data with a wireless protocol and store the pre-packetized data into the memory. Alternately, the controller for the wireless transceiver could command the legacy data logger to dump it memory at predetermined intervals. As the data is dumped to the wireless transceiver the data is pre-packetized with a wireless protocol for later transmission to a wireless data retrieval device. Whenever a wireless retrieval device requests a data transfer the wireless transceiver will transmit the pre-packetized data. A GPS receiver within the navigation system of an unmanned aerial vehicle flying a data retrieval route could invoke the request for data transfer. The GPS could control the UAV navigation system, commanding the UAV to loiter within range of a data logger transceiver until all data was collected. Alternately, a user holding a handheld wireless data retrieval device in communication with a PDA, could via a graphical user interface and a listbox manually invoke a request for data transfer from the wireless transceiver in communication with a legacy data logger. The listbox would contain textural identifiers of legacy data loggers to be "downloaded", i.e., a memory transfer to the PDA via wireless communication.

The wireless transceivers would preferably be of the unlicensed spread spectrum radio frequency type. Transceivers could be of the type ultra-wideband or conventional frequency hopping type. Time Domain Corporation of Huntsville, Ala. makes an ultra-wideband RF chipset suitable to construct RF portion of the present invention. Xemics Corporation makes an integrated transceiver known as the Xemics 1202 that is suitable for constructing the RF section of the wireless transceiver of the present invention.

What is claimed is:

1. An aircraft having a memory loaded with geolocation data corresponding to restricted airspace boundaries and a flight computer programmed with software for rerouting said aircraft outside of said restricted airspace boundaries as said aircraft approaches to within a predetermined distance of said restricted airspace, said aircraft further being controllable by way of a command and control radio signal, wherein said flight computer includes software routines to loiter said aircraft over a predetermined area in the event of a loss of said command and control radio signal.

2. The aircraft of claim 1, wherein said geolocation data corresponding to restricted airspace boundaries is retrievable over the Internet and is remotely downloadable into said aircraft memory.

3. The aircraft of claim 1, wherein said memory is in remote communication with computer running flight-planning software having access to a government controlled restricted airspace database.

4. The aircraft of claim 3, wherein said computer is connected to the Internet.

5. The aircraft of claim 4, wherein said computer is onboard said aircraft.

6. The aircraft of claim 4, wherein said computer is ground based.

7. The aircraft of claim 3, wherein said computer includes software to generate and post a NOTAM to an Internet website.

8. The aircraft of claim 3, wherein said computer includes software for processing user defined destination coordinates into a waypoint set that is downloadable into said aircraft memory.

9. The aircraft of claim 1, wherein said geolocation data corresponding to said restricted airspace boundaries are within a memory belonging to a navigation system of said aircraft.

10. The aircraft of claim 5, wherein said computer further includes software for generating an authorization code and an expiration date for preventing said waypoint set from being used after said expiration date.

11. The aircraft of claim 10, wherein said flight computer is programmed with software to reroute said aircraft to a predetermined safe area.

12. The aircraft of claims 1, wherein said aircraft is a passenger aircraft.

13. The aircraft of claim 1, wherein said aircraft is an unmanned aerial vehicle.

14. The aircraft of claim 1, wherein said aircraft is a radio controlled model aircraft and said restricted airspace boundaries are predefined by a radio control pilot in command of said model aircraft.

15. A communications relay system using unmanned aircrafts, said system comprising:
   a) a ground based wireless communications station;
   b) a first unmanned aircraft for flying a predetermined pattern within wireless communication range of said ground based wireless communications station; and
   c) a second unmanned aircraft for operating within wireless communication range of said first unmanned aircraft and for simultaneously flying outside the wireless range of said ground based wireless communication station and for receiving ground based wireless communications station commands relayed through said first unmanned aircraft.

16. The communications relay system of claim 15, wherein said first unmanned aircraft has first antenna for communicating with said second unmanned aircraft and a second antenna for communicating with said ground based wireless communications station.

* * * * *